US012775234B2

(12) United States Patent
Segawa et al.

(10) Patent No.: US 12,775,234 B2
(45) Date of Patent: Oct. 27, 2026

(54) ELECTROPHOTOGRAPHY CLEANING BLADE, PROCESS CARTRIDGE, AND ELECTROPHOTOGRAPHIC IMAGE FORMING APPARATUS

(71) Applicant: CANON KABUSHIKI KAISHA, Tokyo (JP)

(72) Inventors: Shota Segawa, Shizuoka (JP); Masanori Yokoyama, Shizuoka (JP); Yuichi Kikuchi, Shizuoka (JP); Arihiro Yamamoto, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/218,900

(22) Filed: May 27, 2025

(65) Prior Publication Data

US 2025/0284239 A1 Sep. 11, 2025

Related U.S. Application Data

(63) Continuation of application No. PCT/JP2023/042893, filed on Nov. 30, 2023.

(30) Foreign Application Priority Data

Dec. 2, 2022 (JP) ................................. 2022-193730

(51) Int. Cl.
*G03G 21/00* (2006.01)
*G03G 21/18* (2006.01)

(52) U.S. Cl.
CPC ......... *G03G 21/0017* (2013.01); *G03G 21/00* (2013.01); *G03G 21/1814* (2013.01)

(58) Field of Classification Search
CPC . G03G 21/00; G03G 21/0017; G03G 21/1814
See application file for complete search history.

(56) References Cited

U.S. PATENT DOCUMENTS 9,798,284 B2 10/2017 Shimizu et al.
10,203,648 B2 2/2019 Takeyama et al.
(Continued)

FOREIGN PATENT DOCUMENTS

EP 4071555 A1 * 10/2022 ......... G03G 21/0017
JP 2016-167042 A 9/2016
(Continued)

OTHER PUBLICATIONS

U.S. Appl. No. 19/211,529, filed May 19, 2025, Segawa et al.
(Continued)

*Primary Examiner* — Sophia S Chen
(74) *Attorney, Agent, or Firm* — VENABLE LLP

(57) ABSTRACT

An electrophotographic cleaning blade including an elastic member including a polyurethane; and a support member supporting the elastic member, the electrophotographic cleaning blade cleans a surface of a to-be-cleaned member by bringing a part of the elastic member into contact with the surface of the to-be-cleaned member that is moving, wherein in an environment of 8° C., when a storage elastic modulus of the elastic member at a vibration frequency of $1\times10^{-3}$ Hz is denoted as E'(1) and a storage elastic modulus at a vibration frequency of $1\times10^{4}$ Hz is denoted as E'(2), the E'(1) is 12.0 to 18.0 MPa, and the E'(2) is 530.0 to 1500.0 MPa.

6 Claims, 3 Drawing Sheets

(56) References Cited

U.S. PATENT DOCUMENTS

| | | | |
|---|---|---|---|
| 11,188,020 B2 | 11/2021 | Ogura et al. | |
| 11,262,670 B2 * | 3/2022 | Mochizuki | G03G 21/0017 |
| 11,630,411 B2 | 4/2023 | Yamamoto et al. | |
| 2023/0157492 A1 | 5/2023 | Segawa et al. | |

FOREIGN PATENT DOCUMENTS

| | | | |
|---|---|---|---|
| JP | 2018-4857 | A | 1/2018 |
| JP | 2020-193300 | A | 12/2020 |
| JP | 2021-92756 | A | 6/2021 |
| JP | 2021-173800 | A | 11/2021 |
| WO | 2018/225166 | A1 | 12/2018 |
| WO | 2024/117207 | A1 | 6/2024 |
| WO | 2024/117220 | A1 | 6/2024 |
| WO | 2024/172019 | A1 | 8/2024 |

OTHER PUBLICATIONS

U.S. Appl. No. 19/218,888, filed May 27, 2025, Matsuda et al.
U.S. Appl. No. 19/293,066, filed Aug. 7, 2025, Yokoyama et al.
International Search Report in International Patent Application No. PCT/JP2023/042893 (Jan. 2024).

* cited by examiner

ELECTROPHOTOGRAPHY CLEANING BLADE, PROCESS CARTRIDGE, AND ELECTROPHOTOGRAPHIC IMAGE FORMING APPARATUS

CROSS-REFERENCE TO RELATED APPLICATIONS

This application is a Continuation of International Patent Application No. PCT/JP2023/042893, filed Nov. 30, 2023, which claims the benefit of Japanese Patent Application No. 2022-193730, filed Dec. 2, 2022, both of which are hereby incorporated by reference herein in their entirety.

BACKGROUND

Field of the Technology

The present disclosure relates to an electrophotographic cleaning blade used in an electrophotographic image forming apparatus, a process cartridge, and an electrophotographic image forming apparatus.

Description of the Related Art

Among electrophotographic image forming apparatuses (hereinafter also referred to as electrophotographic apparatuses), some are equipped with a cleaning member to remove the toner remaining on the surfaces of an electrostatic latent image bearing member such as a photoreceptor and an intermediate transfer member even after the transfer of the toner image from the electrostatic latent image bearing member or the intermediate transfer member onto a body to be transferred. One such cleaning member is an electrophotographic cleaning blade (hereinafter also simply referred to as a cleaning blade). Hereinafter, the member whose surface is to be cleaned by bringing a cleaning blade into contact, for example, an electrostatic latent image bearing member or an intermediate transfer member may be referred to as a to-be-cleaned member.

In recent years, as the lifespan of electrophotographic apparatuses becomes further longer, it has been required for a cleaning blade to demonstrate stable and excellent cleaning performance over a long period of time.

The applicant of the present application discloses, in Japanese Patent Laid-Open No. 2021-092756, an electrophotographic cleaning blade provided with an elastic member comprising a polyurethane, which is excellent in chipping resistance and can stably demonstrate excellent cleaning performance.

The present inventors have further studied the electrophotographic cleaning blade according to Japanese Patent Laid-Open No. 2021-092756. In that process, a problem to be solved by the electrophotographic cleaning blade is found. The electrophotographic cleaning blade is formed using polymeric MDI as a raw material for polyurethane. This suppresses the aggregation of hard segments in the polyurethane and achieves excellent cleaning performance by finely dispersing hard segments.

However, the electrophotographic cleaning blade according to Japanese Patent Laid-Open No. 2021-092756 shows a relatively high elastic modulus when it is in contact with the to-be-cleaned member in a stationary state of the cleaning blade due to the use of polymeric MDI as a raw material. Therefore, the nip width tends to be as narrow as several micrometers when the cleaning blade is brought into contact with the to-be-cleaned member. The narrow nip width itself is advantageous in increasing the contact pressure of the cleaning blade against the to-be-cleaned member. However, it has been found that when a scratch occurs on the surface of the to-be-cleaned member, which is to be in contact with the cleaning blade, during the process of the long-term use of the electrophotographic apparatus, a narrow nip width causes a problem of causing cleaning defects at the portion of the scratch.

SUMMARY

At least one aspect of the present disclosure is directed to the provision of a cleaning blade that can stably demonstrate excellent cleaning performance over a long period of time.

In addition, at least one aspect of the present disclosure is directed to the provision of a process cartridge that contributes to the formation of a high-quality electrophotographic image.

In addition, at least one aspect of the present disclosure is directed to the provision of an electrophotographic image forming apparatus that can stably form high-quality electrophotographic images.

At least one aspect of the present disclosure is directed to provide an electrophotographic cleaning blade comprising:

an elastic member comprising a polyurethane; and a support member supporting the elastic member, the electrophotographic cleaning blade cleans a surface of a to-be-cleaned member by bringing a part of the elastic member into contact with the surface of the to-be-cleaned member that is moving, wherein in an environment of 8° C., when a storage elastic modulus of the elastic member at a vibration frequency of $1\times10^{-3}$ Hz is denoted as E'(1) and a storage elastic modulus at a vibration frequency of $1\times10^{4}$ Hz is denoted as E'(2), the E'(1) is 12.0 to 18.0 MPa, and the E'(2) is 530.0 to 1500.0 MPa.

In addition, at least one aspect of the present disclosure is directed to provide a process cartridge comprising the above electrophotographic cleaning blade. Moreover, at least one aspect of the present disclosure is directed to provide an electrophotographic image forming apparatus comprising the above electrophotographic cleaning blade.

Features of the present disclosure will become apparent from the following description of embodiments with reference to the attached drawings.

DESCRIPTION OF THE EMBODIMENTS

Figure 1:
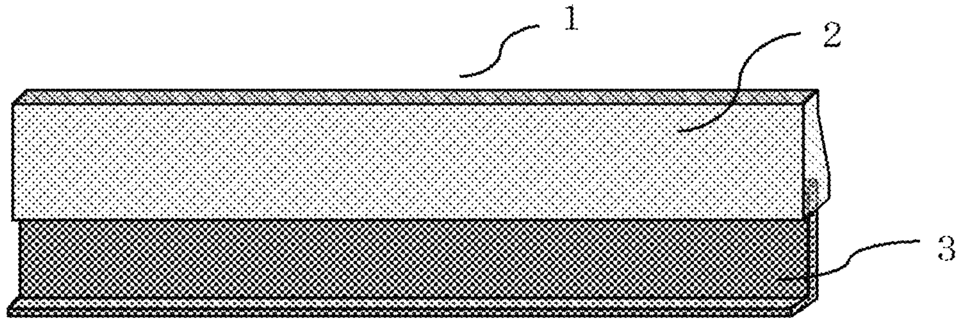
FIG. 1 is a schematic perspective view of an electrophotographic cleaning blade according to one aspect of the present disclosure.

In the present disclosure, the expression of "from XX to YY" or "XX to YY" indicating a numerical range means a numerical range including a lower limit and an upper limit which are end points, unless otherwise specified. When a numerical range is described in a stepwise manner, the upper and lower limits of each numerical range can be arbitrarily combined.

In addition, in the present disclosure, for example, descriptions such as "at least one selected from the group consisting of XX, YY and ZZ" mean any of XX, YY, ZZ, the combination of XX and YY, the combination of XX and ZZ, the combination of YY and ZZ, and the combination of XX, YY, and ZZ.

The present inventors have studied with the aim of obtaining a cleaning blade capable of stably demonstrating excellent cleaning performance even when a scratch occurs on the surface of a to-be-cleaned member in the process of long-term use.

In this process, the present inventors have considered reducing the elastic modulus of the elastic member so as to increase the nip width with a to-be-cleaned member and stabilize the contact between the cleaning blade and the to-be-cleaned member. Meanwhile, increasing the nip width decreases the contact pressure per unit area at the nip portion and decreases the cleaning performance. Furthermore, if the elastic modulus of the cleaning blade is reduced, a so-called stick-slip is likely to occur. Stick-slip means that the tip of an elastic member of a cleaning blade is extended in the advancing direction of a to-be-cleaned member and then returns to the original shape by elasticity. When this stick-slip occurs, the toner and the external additive easily slip through the cleaning blade, and faulty cleaning is likely to occur.

Thus, the present inventors have made additional studies to achieve both sufficient nip width and excellent cleaning performance at a higher level. As a result, regarding the storage elastic modulus to a specific vibration frequency of an elastic member of a cleaning blade under a low-temperature environment at a temperature of 8° C., when a storage elastic modulus at a low frequency ($1\times10^{-3}$ Hz) is denoted as E'(1) and a storage elastic modulus at a high frequency ($1\times10^{4}$ Hz) is denoted as E'(2), the present inventors have found that E'(1) of 12.0 to 18.0 MPa and E'(2) of 530.0 to 1500.0 MPa are effective to achieve both sufficient nip width and excellent cleaning performance at a higher level.

E'(1) being in the range of 12.0 to 18.0 MPa indicates that the elastic member is sufficiently soft in a steady state where the to-be-cleaned member and the cleaning blade is in stationary contact. This sufficiently ensures the nip width between the elastic member of the cleaning blade and the to-be-cleaned member.

Meanwhile, E'(2) being in the range of 530.0 to 1500.0 MPa indicates that the elastic member is sufficiently hard in a state where the to-be-cleaned member and the cleaning blade are in contact with each other while moving relatively, and the vibration is applied to the elastic member. This improves the scraping ability of dirt on the surface of the to-be-cleaned member and suppresses stick-slip caused by extending the contact region of the elastic member with the to-be-cleaned member in the moving direction of the to-be-cleaned member.

In conventional elastic members comprising polyurethane, storage elastic modulus also tends to increase as the vibration frequency increases. However, it is considered that a polyurethane-comprising elastic member that achieves both a storage elastic modulus at a low frequency that is sufficiently low as above and a storage elastic modulus at a high frequency that is sufficiently high as above has not been known before.

A cleaning blade according to one aspect of the present disclosure will be described below.

The electrophotographic cleaning blade (hereinafter simply referred to as a "cleaning blade") according to one aspect of the present disclosure is applied to the to-be-cleaned member, such as an image bearing member such as a photoreceptor, an endless belt such as an intermediate transfer belt, and the like. An embodiment of a cleaning blade according to an aspect of the present disclosure will be described in detail below with reference to an example of an image bearing member as a to-be-cleaned member, but the present disclosure is not limited thereto. In the following description, components having the same function are denoted by the same reference numerals in the drawings, and the description thereof may be omitted.

<Configuration of Cleaning Blade>

The cleaning blade comprises an elastic member comprising a polyurethane and a support member that supports the elastic member, and cleans the surface of the to-be-cleaned member by bringing a part of the elastic member into contact with the surface of the to-be-cleaned member that is moving.

FIG. 1 is a schematic perspective view of a cleaning blade 1 according to one aspect of the present disclosure. The cleaning blade 1 comprises an elastic member 2 and a support member 3 that supports the elastic member 2.

Figure 2:
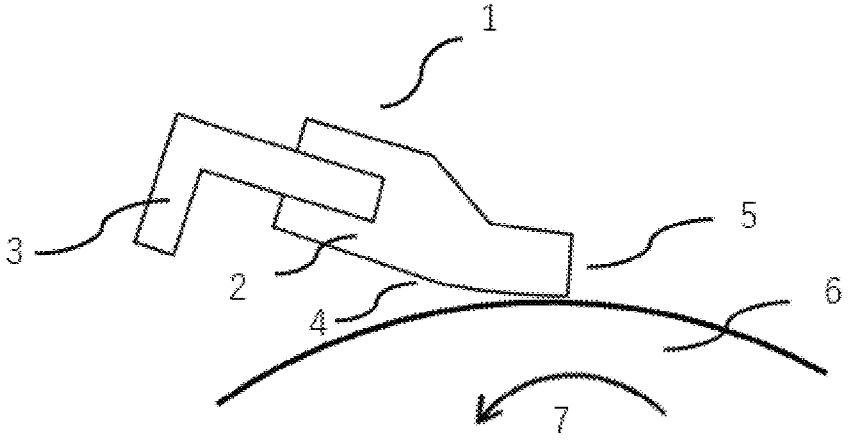
FIG. 2 is a view showing a state where the edge of the cleaning blade is in contact with the to-be-cleaned member when the process cartridge is stationary.

FIG. 2 is a cross-sectional view of an example schematically illustrating a state in which a cleaning blade according to one aspect of the present disclosure is in contact with a to-be-cleaned member. The elastic member 2 has a main surface 4 facing the to-be-cleaned member 6 and a tip surface 5 that forms a tip side edge together with the main surface 4. The numeral 7 indicates the direction of rotation of the to-be-cleaned member.

<Analysis of Cleaning Phenomenon, Vibration and Cleaning>

The present inventors have analyzed in detail the behavior of a contact region (tip of the elastic member) of the elastic member with the member to be contacted when the cleaning blade is in contact with the stationary member to be contacted and the behavior of the tip of the elastic member when the cleaning blade is in contact with the moving member to be contacted. As a result, the present inventors have found that the nip width between the cleaning blade and the to-be-cleaned member and the cleaning performance relate to the storage elastic modulus of the elastic member at the following first and second vibration frequencies.

<Storage Elastic Modulus E'(1) at First Vibration Frequency>

Regarding the nip width between the cleaning blade and the to-be-cleaned member, the storage elastic modulus of the elastic member of the cleaning blade when the vibration frequency is $1\times10^{-3}$ Hz (hereinafter also referred to as "the first vibration frequency") is important.

Since the cleaning blade remains in contact with the photoreceptor even during a non-operation state, a nip between the cleaning blade and the to-be-cleaned member is formed in a state where stress is sufficiently relaxed.

The first vibration frequency related to the contact between the cleaning blade and the to-be-cleaned member in the steady state can be determined in the following way. An elastic member of a cleaning blade is brought into contact with one surface of a transparent flat glass plate, and while the glass plate is moved in a direction orthogonal to the longitudinal direction of the cleaning blade, a state of nipping is observed from the other surface side of the flat glass plate using a laser microscope. At this time, it can be observed that the nip width widens as the time during which the flat glass plate and the cleaning blade are in contact with each other and left as they are longer. This nip spread can be observed to converge at about $1\times10^{-3}$ Hz. From this, it is considered that the vibration frequency related to the contact state between the cleaning blade and the to-be-cleaned member is $1\times10^{-3}$ Hz. Thus, the storage elastic modulus at $1\times10^{-3}$ Hz affects the nip width.

The nip width is preferably 17 μm or more, more preferably 18 μm or more, and more preferably 19 μm or more so as to prevent the toner and the external additive from slipping through the nip portion at the site where the scratch occurs when a scratch occurs on the to-be-cleaned member. Furthermore, from the viewpoint of ensuring the contact pressure of the cleaning blade against the to-be-cleaned member, the nip width is preferably 25 μm or less, in particular, more preferably 24 μm or less, and even more preferably 23 μm or less. For example, the nip width may preferably be within the range of 17 to 25 μm, 19 to 24 μm, or 20 to 27 μm.

<Storage Elastic Modulus E'(2) at Second Vibration Frequency>

The vibration frequency (second vibration frequency) related to the stick-slip of the tip of the cleaning blade brought into contact with the to-be-cleaned member is $1\times10^{4}$ Hz.

The vibration frequency related to the stick-slip can be measured in the following way.

In a state where the elastic member of the cleaning blade is in contact with the electrophotographic photosensitive drum as a to-be-cleaned member, the electrophotographic photosensitive drum was rotated (at a rotation speed of 150 rpm) while supplying a small amount of toner, and the movement of the tip of the contact region of the cleaning blade at that time was observed by a laser displacement meter. As a result, the displacement was observed at a period of $1\times10^{4}$ Hz. It is considered that this indicates that the stick-slip causes the tip of the cleaning blade to move at a period of $1\times10^{4}$ Hz. Therefore, it is believed that the storage elastic modulus at $1\times10^{4}$ Hz related to stick-slip affects the stick-slip width.

When stick-slip occurs, the toner or external additives present near the nip may not be scraped off and may slip out of the cleaning blade. Accordingly, by reducing the amount of vibration of the cleaning blade due to stick-slip, the possibility that the toner and the external additive may slip through the cleaning blade can be reduced, and as a result, the cleaning performance can be improved.

Specifically, the stick-slip width measured under the conditions described in [Stick-Slip Evaluation] of the examples described below is preferably 20 μm or less, more preferably 17 μm or less, and even more preferably 15 μm or less. The smaller the stick-slip width, the more preferable, and the lower limit of the stick-slip width is not particularly limited. For example, the preferable stick-slip width may be 0 to 15 μm, 0 to 17 μm, or 0 to 20 μm.

<Dynamic Viscoelasticity and Cleaning>

As described above, the present inventors have advanced the study by focusing on the frequency dependence of the dynamic viscoelasticity of the urethane material from the knowledge that the vibration of the elastic member of the cleaning blade closely relates to the cleaning phenomenon.

For example, the present inventors have found that a cleaning blade in the aspect described below can demonstrate excellent cleaning performance even in a long-life system.

Specifically, the elastic member has the following characteristics in an 8° C. environment.

When a storage elastic modulus of the elastic member at a vibration frequency of $1\times10^{3}$ Hz is denoted as E'(1) and a storage elastic modulus of the elastic member at a vibration frequency of $1\times10^{4}$ Hz is denoted as E'(2), E'(1) is 12.0 to 18.0 MPa, and E'(2) is 530.0 to 1500.0 MPa.

The storage elastic modulus E'(1) of the elastic member at a vibration frequency of $1\times10^{-3}$ Hz affects the formation of an appropriate nip width. When E'(1) is 18.0 MPa or less, the elastic member is sufficiently soft when the elastic member is in contact with a stationary to-be-cleaned member and forms a nip and an appropriate nip width can be secured, and, therefore, contact can be maintained even in long-term use, and toners and external additives are prevented from slipping through. When E'(2) is 12.0 MPa or more, an excessive increase in the nip width due to excessive softness of the elastic member can be suppressed. As a result, the contact pressure of the cleaning blade against the to-be-cleaned member at the nip part can be properly maintained.

E'(1) is more preferably 17.5 MPa or less and still more preferably 17.0 MPa or less. In addition, it is more preferably 12.5 MPa or more and still more preferably 13.0 MPa or more. For example, preferably, the range of 12.5 to 17.5 MPa or 13.0 to 17.0 MPa can be mentioned.

The value of E'(1) can be controlled by the molecular mobility of the components constituting the elastic member. Specific control methods will be described later.

The storage elastic modulus E'(2) of the elastic member at a vibration frequency of $1\times10^{4}$ Hz affects the suppression of stick-slip. E'(2) being from 530.0 MPa to 1500.0 MPa indicates that the tip of an elastic member of the cleaning blade is hard to move when the cleaning blade is vibrated at $1\times10^{4}$ Hz, that is, the tip is hard to extend in the moving direction of the to-be-cleaned member. As a result, stick-slip can be suppressed, and slipping-through of the toner and the external additive can be suppressed.

E'(2) is preferably 750.0 MPa or more and more preferably 950.0 MPa or more from the viewpoint of the suppression of stick-slip. For example, E'(2) is preferably from 750.0 to 1500.0 MPa and particularly preferably from 950.0 to 1500.0 MPa.

The value of E'(2) can be controlled by the molecular mobility of the components constituting the elastic member. Specific control methods will be described later.

The elastic member comprises polyurethane. The polyurethane (specifically, a polyurethane elastomer) consists of, for example, hard segments and soft segments. In the present disclosure, hard segments refer to components with small molecular mobility at or near crosslinking points, such as isocyanurate bonds, polymeric MDI, trimethylolpropane, aggregated crystal components of urethane bonds, or the like. Soft segments refer to segments with large molecular mobility between the crosslinking points.

The elastic modulus in the low-frequency region like E'(1) reflects the overall mobility of polyurethane molecules and is affected by both the molecular mobility of hard segments and the molecular mobility of soft segments.

In the low-frequency region, soft segments, which are components with high molecular mobility, can move freely because the time to relaxation is sufficient, and have a small contribution to elastic modulus, but hard segments, which are components with small molecular mobility, cannot move freely, and the magnitude of molecular mobility thereof contributes to elastic modulus. That is, the larger the molecular mobility of the hard segments, the smaller the E'(1), and the smaller the molecular mobility of the hard segments, the larger the E'(1). Accordingly, for the polyurethane in the elastic member according to one aspect of the present disclosure, it is important to increase the molecular mobility of the hard segments.

In contrast, in the high-frequency region, even soft segments cannot move freely because the time to relaxation is short, and the magnitude of the molecular mobility thereof contributes to the elastic modulus. Meanwhile, hard segments cannot move sufficiently. Therefore, when the soft segments can no longer move freely, the entire polymer is frozen, and the elastic modulus rapidly increases. Accordingly, the effect of the molecular mobility of soft segments is more pronounced than the effect of the molecular mobility of hard segments on the storage elastic modulus in the high-frequency region. That is, the larger the molecular mobility of soft segments, the smaller the E'(2), and the smaller the molecular mobility of soft segments, the larger the E'(2). Accordingly, for the polyurethane in the elastic member according to one aspect of the present disclosure, it is important to decrease the molecular mobility of the soft segments.

As described above, E'(1) can be mainly controlled by adjusting the molecular mobility of hard segments, and E'(2) can be mainly controlled by adjusting the molecular mobility of soft segments.

The molecular mobility of hard segments becomes smaller with the increase in rigid components, such as isocyanurate bonds in polyurethane, crosslinked portions derived from polymeric MDI, or a crystalline structure formed by the interaction between soft segments, and becomes larger by making the crosslinking points flexible.

Accordingly, in order to reduce E'(1), it is preferable not to use polymeric MDI as little as possible as a raw material for polyurethane, and it is particularly preferable not to use at all. In order not to form crystal components due to the interaction of soft segments, it is preferable to use trimethylolpropane (TMP) as a crosslinking component. By introducing crosslinking structures derived from TMP into polyurethane, soft segment portions existing between the crosslinking structures are less likely to interact with each other due to steric hindrance of the cross-linked structures derived from TMP. As a result, the formation of crystalline structures (crystal components), in other words, hard segments, due to the interaction of the soft segments with each other is inhibited.

Since trimethylolpropane has a methylene skeleton adjacent to a hydroxyl group, molecular-structurally flexible cross-linked structures are formed. As a result, the polyurethane according to an aspect of the present disclosure has a higher molecular mobility of hard segments than a polyurethane having a rigid crosslinked structure derived from polymeric MDI, which can reduce E'(1).

The molecular mobility of soft segments can be controlled by crosslinking density. The higher the crosslinking density, the smaller the molecular weight between the crosslinking points and the smaller the space where the soft segments can move freely, and thus, the molecular mobility becomes smaller. It is also effective to make the length of the soft segments between the crosslinking points uniform in order to suppress the molecular mobility of the soft segments.

Also, making the length of soft segments uniform can make the rise of storage elastic modulus from low-frequency ranges to high-frequency ranges in the master curve steeper. Thus, it is possible to obtain an elastic member with E'(1) in the range of 12.0 to 18.0 MPa and E'(2) in the range of 530.0 to 1500.0 MPa more easily.

In order to obtain a polyurethane with a short distance between crosslinking points and uniform length between crosslinking points, for example, it is preferable to control the number average molecular weight of the prepolymer as a raw material for polyurethane to be within the range of 8000 to 12000 and not to use a chain extender such as 1,4-butanediol as little as possible, and in particular, it is preferable not to use any chain extender at all.

One example of the conditions for measuring the number average molecular weight of the prepolymer is as follows.

Device: HLC-8320GPC (trade name, manufactured by Tosoh Corporation)

Column: TSKgel SuperMultiporeHZ-N (trade name, Tosoh Corporation; 4.6 mm ID×15 cm)

Eluent: THF

Flow rate: 0.35 mL/min.

Sample: 0.5 wt % THF solution

Injection amount: 10 μL

Detector: RI

Temperature: 40° C.

Standard substance: Polystyrene

Specifically, by making the molecular mobility of the hard segments large and the molecular mobility of the soft segments small, an elastic member having a small E'(1) and a large E'(2) can be obtained. As a result, an elastic member can achieve both the formation of an appropriate nip width and suppression of stick-slip, that is different from a conventional one, can be obtained.

The elastic member of the cleaning blade according to Japanese Patent Laid-Open No. 2021-092756 uses polymeric MDI as a raw material for polyurethane in order to make hard segments fine and dispersed. Thus, the crosslinking point derived from polymeric MDI becomes rigid, and the molecular mobility of hard segments is reduced. Therefore, it is considered that the value of E'(1) is not sufficiently small as the cleaning blade according to the present disclosure. A specific example is shown in Comparative Example 1 described below. Accordingly, it is considered that the cleaning blade according to Japanese Patent Laid-Open No. 2021-092756 is more likely to have a narrower nip width than the cleaning blade according to the present disclosure. Therefore, the cleaning blade according to Japanese Patent Laid-Open No. 2021-092756 has room for improvement in cleaning performance when used for a to-be-cleaned member with scratches.

Although the cleaning blade for an electrophotographic apparatus according to Japanese Patent Laid-Open No. 2018-004857 uses trimethylolpropane as a crosslinking component in Examples, the amount of addition is small. As a result, in the polyurethane according to Japanese Patent Laid-Open No. 2018-004857, it is considered that a crystalline structure is likely to occur due to aggregation of the soft segments, and the value of the storage elastic modulus in the low-frequency region is increased. In addition, Japanese Patent Laid-Open No. 2018-004857 discloses the use of a chain extender such as 1,4-butanediol as a raw material for polyurethane. Therefore, it is considered that the lengths between the crosslinking points of the soft segments are uneven. As a result, it is considered that the storage elastic modulus in the high-frequency region is not sufficiently high because the master curve showing the relationship of the storage elastic modulus to the vibration frequency does not rise sharply. Accordingly, the cleaning blade for an electrophotographic apparatus according to Japanese Patent Laid-Open No. 2018-004857 may have a narrow nip width, and a stick-slip may not be sufficiently suppressed.

As described above, securing nip width and suppressing stick-slip tend to be contradictory. In contrast, the elastic member used for the cleaning blade according to the present disclosure can suppress stick-slip while forming an appropriate nip width by making E'(1) smaller and E'(2) larger, in other words, by making the master curve, which indicates the relationship of storage elastic modulus to vibration frequency, more steep.

<Method for Measuring Storage Elastic Modulus>

E'(1) and E'(2) can be obtained by measuring the dynamic viscoelasticity of a sample using a dynamic viscoelasticity apparatus under a condition where frequency and temperature are set arbitrarily, and creating a master curve at a reference temperature of 8° C. from the measured data.

The master curve is created based on the time-temperature equivalence principle. The horizontal axis represents frequency, and the vertical axis represents elastic modulus. The master curve can be created by shifting the data of frequency dispersion measured at each temperature in the horizontal axis direction so as to overlap the data of the reference temperature.

For example, the obtained master curve is curve-fitted and converted into a mathematical formula based on a generalized Maxwell model to calculate the storage elastic modulus E'(1) of the elastic member at $1\times10^{-3}$ Hz and the storage elastic modulus E'(2) of the elastic member at $1\times10^{4}$ Hz.

The reason why the temperature at which the storage elastic modulus is measured is set to 8° C. is because when a printer is used in a low-temperature region such as 8° C. the toner is liable to be charged with electric charges, and the attachment force of the toner to the photoreceptor increases, which makes cleaning more difficult.

The molecular mobility of the soft and hard segments can be evaluated on the basis of spin-spin relaxation time T2 (lateral relaxation time) in pulse NMR.

In a pulse NMR measurement at an environment of 50° C., when separated into two components of hard segments and soft segments, the spin-spin relaxation time ($T2_L$) of the soft segment is preferably 250 to 320 s.

If the soft segments have high molecular mobility, the spin-spin relaxation time ($T2_L$) of the soft segments is large because relaxation takes time.

The spin-spin relaxation time T2 is measured by a solid echo method using a pulse NMR apparatus.

The pulse NMR apparatus is an apparatus for evaluating the mobility of polymer molecules, such as rubber, on the basis of the mobility (relaxation time) of hydrogen atoms in the molecular chain, and in this embodiment, the solid echo method is used as the sequence. The solid echo method itself using a pulse NMR apparatus can be a known method and is not particularly limited.

By measuring the spin-spin relaxation time T2 of the elastic member of the cleaning blade by pulse NMR measurement, a T2 relaxation curve (free induction decay curve) is obtained.

A specific measurement means will be described later.

If $T2_L$ is less than 250 µs, E'(1) is likely to be large. In contrast, when $T2_L$ exceeds 320 µs, E'(2) is likely to be small. $T2_L$ of 250 to 320 µs facilitates E'(1) and E'(2) to satisfy the specific ranges mentioned above.

$T2_L$ is more preferably 260 µs or more and still more preferably 270 µs or more. In addition, it is more preferably 310 µs or less and still more preferably 300 µs or less. For example, it is preferably within the range of 260 to 310 µs or 270 to 300 µs.

$T2_L$ can be controlled by the molecular mobility of soft segments. The molecular mobility of soft segments can also be controlled by crosslinking density. The higher the crosslinking density, the smaller the molecular weight between the crosslinking points and the smaller the space where the soft segments can move freely, and thus, the molecular mobility becomes smaller.

In a pulse NMR measurement at an environment of 50° C., the T2 relaxation time ($T2_S$) of the hard segment is preferably 52 to 85 µs when separated into two components of hard segments and soft segments.

If $T2_S$ is less than 52 µs, E'(1) is likely to be large. In contrast, when $T2_S$ exceeds 85 µs, E'(2) is likely to be small. $T2_S$ of 52 to 85 µs, facilitates E'(1) and E'(2) to satisfy the specific ranges mentioned above.

<Achieving Method>

Specific control method for the molecular mobility of soft and hard segments for reducing E'(1) and increasing E'(2) are described.

<Molecular Mobility of Hard Segments>

The molecular mobility of hard segments is affected by rigid components in the molecule. Rigid components are isocyanurates and crystals, and by reducing these, the molecular mobility of hard segments can be increased. Accordingly, it is desirable to minimize the isocyanurate bonds and make the urethane rich. Specifically, the details are as follows.

In an FT-IR measurement of an elastic member using diamond as the ATR crystal, a value of a ratio of a peak intensity at 1415 $cm^{-1}$ to a peak intensity at 1538 $cm^{-1}$ {(peak intensity at 1415 $cm^{-1}$)/(peak intensity at 1538 $cm^{-1}$)} is preferably 0.50 to 0.65.

The peak at 1415 $cm^{-1}$ in FT-IR analysis of the elastic member using diamond as the ATR crystal is the peak corresponding to the ring of the isocyanurates.

Meanwhile, the peak at 1538 $cm^{-1}$ is the peak corresponding to the NH bending of the urethane bond. That is, the value of {(peak intensity at 1415 $cm^{-1}$)/(peak intensity at 1538 $cm^{-1}$)} in the range of 0.50 to 0.65 indicates that there are few isocyanurate bonds in the elastic member.

The value (peak intensity ratio) of {(peak intensity at 1415 $cm^{-1}$)/(peak intensity at 1538 $cm^{-1}$)} of greater than 0.65 indicates that many isocyanurate bonds are present in the elastic member. Therefore, the molecular mobility of hard segments is likely to be small, and E'(1) is likely to be large due to the rigidity of the isocyanurates. In contrast, if the value of {(peak intensity at 1415 $cm^{-1}$)/(peak intensity at 1538 $cm^{-1}$)} is less than 0.50, E'(1) is likely to be too small reversely. Therefore, the ratio is preferably within the range of 0.50 to 0.65. The value of the {(peak intensity at 1415 $cm^{-1}$)/(peak intensity at 1538 $cm^{-1}$)} is preferably 0.53 to 0.65.

To control the value of {(peak intensity at 1415 $cm^{-1}$)/(peak intensity at 1538 $cm^{-1}$)} to be the above specific range, a method of reducing the isocyanurate bonds and making it urethane rich, and the like may be mentioned. Specifically, the use of a urethanization catalyst while avoiding a catalyst that promotes the formation of isocyanurates, the approach of the formulating ratio of —NCO to —OH in the prepolymer to 1, and setting the reaction temperature when the material of the prepolymer is reacted to 100° C. or lower may be mentioned.

If it is within the range that satisfies E'(1) and E'(2), the polyurethane may have a rigid structure, such as polymeric MDI, as a constitutional component. Specifically, the details are as follows.

When a side of the cleaning blade that is contact with the surface of the to-be-cleaned member is defined as the tip side of the cleaning blade, the elastic member has a plate shape having, at least on the tip side, a main surface (4) facing the to-be-cleaned member and a tip surface (5) forming a tip side edge together with the main surface. Then, it is assumed that a third line segment having a distance of 0.5 mm from the tip side edge is drawn on the tip surface in parallel with the tip side edge. Then, the length of the third line segment is denoted as L', and points of ⅛L', ½L', and ⅞L' from one end side on the third line segment are respectively denoted as P0', P1', and P2'.

Samples respectively sampled at the P0', P1', and P2' are heated and vaporized in an ionization chamber, and heated up to 1000° C. at a ramp rate of 10° C./s using a direct sample introduction type mass spectrometer that ionize sample molecules. The detection amount of all ions obtained as a result is denoted as M1, and the integrated intensity of peaks of an extracted ion thermogram corresponding to an m/z value in the range of 380.5 to 381.5 derived from polymeric MDI is denoted as M2. At this time, M2/M1 is preferably less than 0.0010.

As the isocyanate, it is preferable to use 4,4'-MDI that is highly reactive and has two isocyanate groups with equivalent reactivity. Meanwhile, the use of the polymeric MDI, which is a trifunctional MDI, is preferably minimized, as described above, and especially not used at all. Specifically, M2/M1 is preferably less than 0.0010. When M2/M1 satisfies the specific range, E'(1) is likely to satisfy a good range.

M2/M1 is more preferably 0.0009 or less. The lower M2/M1 is, the more preferable, and the lower limit of M2/M1 is not particularly limited, but M2/M1 is preferably 0.0000 or more.

If M2/M1 is 0.0010 or more, E'(1) is likely to be larger due to the rigidity of polymeric MDI.

Furthermore, in order to increase the molecular mobility of the hard segments, it is preferable to minimize the crystalline structure as little as possible. Specifically, it is preferable to minimize materials that easily form crystalline structures, such as 1,4-butanediol, and to make crosslinking agents, such as trimethylolpropane, rich. A crosslinking agent such as trimethylolpropane makes it easier to take a distance between the urethane bonds and makes it difficult to form a crystalline structure.

<Molecular Mobility of Soft Segments>

The molecular mobility of soft segments is susceptible to the distance between crosslinking points and the structure between crosslinking points. Therefore, for example, by shortening the distance between crosslinking points and increasing the ester group concentration of the polyol, the molecular mobility of the soft segment can be reduced.

Examples of methods of shortening the distance between crosslinking points may include a method of increasing the concentration of the crosslinking agent in the raw material composition of the elastic member. The distance between the crosslinking points depends on the ester group concentration, but is preferably about 6000 to 9000 g/mol. The concentration of the crosslinking agent in the raw material composition of the elastic member is, also in terms of the molecular mobility of the hard segments, preferably 0.30 to 0.70 mmol/g, more preferably 0.40 to 0.61 mmol/g, and still more preferably 0.50 to 0.60 mmol/g.

A method of calculating the concentration of crosslinking agents is described below. For example, the concentration can be quantified by pyrolysis GC/MS.

The polyhydric alcohol is detected by pyrolysis GC/MS. The measurement conditions are shown below.

Apparatus:

Pyrolysis apparatus: "EGA/PY-3030D" (trade name, manufactured by Frontier Laboratories Ltd.)

Gas Chromatography Apparatus: "TRACE 1310 gas chromatograph" (trade name, manufactured by Thermo Fisher Scientific K.K.)

Mass spectrometer: "ISQLT" (trade name, manufactured by Thermo Fisher Scientific K.K.)

Pyrolysis temperature: 500° C.

GC column: inner diameter 0.25 mm×30 m stainless capillary column

Stationary phase: 5% phenyl polydimethylsiloxane

Temperature-raising conditions: retain the temperature at 50° C. for 3 minutes and raise the temperature to 300° C. at a rate of 8° C./min.

MS conditions mass number range: m/z 10 to 650

Scan rate: 1 second/scan

The type of polyhydric alcohol is qualified by GC/MS. A calibration curve in GC analysis of qualified polyhydric alcohol species at known concentrations is created, and quantitative determination is performed from the GC peak area ratio to calculate the concentration of the crosslinking agent in the raw material composition.

Furthermore, it is preferred that the distance between the crosslinking points of the soft segments is as uniform as possible. If the distance between the crosslinking points is uneven, the molecular mobility of the entire elastic member is likely to vary. For example, some components with higher molecular mobility may reduce E'(2), and some components with lower molecular mobility may increase E'(1). Accordingly, in order for E'(1) and E'(2) to satisfy the above specific ranges, it is preferable to make the distance between the crosslinking points uniform while reducing the rigid components and increasing the crosslinking structure. Methods of making the distance between crosslinking points uniform are not limited, and examples thereof may include a method of producing polyurethane by a prepolymer method using a prepolymer with molecular weight distribution as uniform as possible. It is also preferable to provide a simple material composition with uniform molecular weight so that the molecular weight distribution be uniform. It is also preferable to reduce the use of chain extenders such as a glycol that is likely to make the molecular weight distribution uneven.

At this time, the number average molecular weight of the prepolymer is preferably 8000 to 12000. The molecular weight can be analyzed by GPC in the manner described above.

[Support Member]

The cleaning blade of the present disclosure has a support member that supports an elastic member. The materials that constitute the support member are not particularly limited, and examples thereof may include the following materials. Metal materials such as steel plates, stainless steel plates, galvanized steel plates, and chromium-free steel plates; resin materials such as 6-nylon and 6,6-nylon; and the like.

Also, the shape and structure of the support member are not particularly limited. For example, one end of the elastic member of the cleaning blade is supported by a support member, as illustrated in FIG. 2 or the like.

[Elastic Member]

The elastic member comprises a polyurethane. Specifically, the elastic member comprises a polyurethane elastomer. The polyurethane elastomer constituting the elastic member can be mainly obtained from raw materials such as a polyol, a chain extender, a crosslinking agent, a polyisocyanate, a catalyst, other additives, and the like. Hereinafter, these raw materials will be described in detail.

Examples of polyols may include the following. Polyester polyols such as polyethylene adipate polyol, polybutylene adipate polyol, polyhexylene adipate polyol, (polyethylene/ polypropylene) adipate polyol, (polyethylene/polybutylene) adipate polyol, and (polyethylene/polyneopentylene) adipate polyol; a polycaprolactone-based polyol obtained by ring-opening polymerization of a caprolactone; polyether polyols such as polyethylene glycol, polypropylene glycol, and polytetramethylene glycol; polycarbonate diol; and the like. One of them may be used alone, or two or more of them may be used in combination.

Among the above polyols, polyester polyols using adipates are preferable because a polyurethane elastomer having excellent mechanical properties can be obtained. A polyester polyol using butylene adipate is more preferable.

As the chain extender, a glycol or a trihydric or higher polyhydric alcohol capable of extending a polyurethane elastomer chain, or the like can be used.

Examples of glycols may include the following. Ethylene glycol (EG), diethylene glycol (DEG), propylene glycol (PG), dipropylene glycol (DPG), 1,4-butanediol (1,4-BD), 1,6-hexanediol (1,6-HD), 1,4-cyclohexanediol, 1,4-cyclohexanedimethanol, xylylene glycol (terephthalyl alcohol), and triethylene glycol.

Examples of trihydric or higher polyhydric alcohols may include trimethylolpropane, glycerin, pentaerythritol, and sorbitol. One of them may be used alone, or two or more of them may be used in combination. These trihydric or higher polyhydric alcohols are preferably used as crosslinking agents. Among the above polyhydric alcohols, trimethylolpropane is more preferable.

Examples of the above polyisocyanate may include the following. 4,4'-Diphenylmethane diisocyanate (4,4'-MDI), polymeric MDI, 2,4-tolylene diisocyanate (2,4-TDI), 2,6-tolylene diisocyanate (2,6-TDI), xylene diisocyanate (XDI), 1,5-naphthylene diisocyanate (1,5-NDI), p-phenylene diisocyanate (PPDI), hexamethylene diisocyanate (HDI), isophorone diisocyanate (IPDI), 4,4'-dicyclohexylmethane diisocyanate (hydrogenated MDI), tetramethylxylene diisocyanate (TMXDI), and carbodiimide-modified MDI. Among the polyisocyanates mentioned above, 4,4'-MDI, which is highly reactive and in which two isocyanate groups have equivalent reactivity, is preferred.

As the catalyst, a commonly used catalyst for curing a polyurethane elastomer may be used. For example, tertiary amine catalysts and the like may be mentioned, and specifically, the following may be exemplified. Amino alcohols such as dimethylethanolamine, N,N,N'-trimethylaminopropylethanolamine, N,N'-dimethylhexanolamine; trialkylamines such as triethylamine; tetraalkyldiamines such as N,N,N'N'-tetramethyl-1,3-butanediamine; triethylene diamine, piperazine-based compounds, and triazine-based compounds. Organic acid metal salts, such as potassium acetate, potassium alkali octylate, and the like may also be used. Additionally, metal catalysts usually used for urethanization, such as dibutyltin dilaurate, may also be used. One of them may be used alone, or two or more of them may be used in combination.

As the catalyst, N,N'-dimethylhexanolamine is preferred. Examples of commercially available ones may include KAOLIZER No. 25 (trade name), manufactured by Kao Corporation. Said catalyst is a catalyst suitable for making urethanization more dominant than isocyanurate formation. In addition, the above catalyst has a hydroxy group at the terminal and reacts itself to be incorporated internally while serving as a catalyst, so the possibility of a chemical attack due to seepage can be reduced. Furthermore, it is preferable because of good reactivity. An ethylene glycol solution of potassium acetate is also preferable. Examples of commercially available ones may include POLYCAT 46 (trade name, manufactured by Air Products and Chemicals Japan, Inc.).

For example, the polyurethane elastomer is preferably a cured product of a mixture comprising at least one polyol selected from the group consisting of a polyester polyol and a polyether polyol, a trihydric or higher polyhydric alcohol, and 4,4'-MDI.

For example, the polyurethane elastomer is preferably a cured product of a mixture comprising at least one polyol selected from the group consisting of a polyester polyol and a polyether polyol, a polyisocyanate including 4,4'-MDI, and a trihydric or higher polyhydric alcohol.

In the constituent components of the mixture as the raw material of the polyurethane elastomer, the content of the polyol is preferably 50 to 80% by mass and more preferably 55 to 70% by mass.

In the constituent components of the mixture as the raw material of the polyurethane elastomer, the content of the polyisocyanate is preferably 15 to 50% by mass and more preferably 25 to 40% by mass.

In the constituent components of the mixture as the raw material of the polyurethane elastomer, the content of the trihydric or higher polyhydric alcohol is preferably 3 to 15% by mass and more preferably 5 to 10% by mass.

As necessary, additives such as a pigment, a plasticizer, a water-proofing agent, an antioxidant, a UV-absorbing agent, and a light stabilizer may be formulated in the raw materials constituting the elastic member.

<Method of Producing Cleaning Blade>

The method of producing the cleaning blade according to the present disclosure is not particularly limited, and any suitable methods may be selected among known methods.

The method of producing the elastic member comprising a polyurethane elastomer is not particularly limited, but it is preferable to include the following steps, for example. The polyurethane elastomer composition is preferably prepared by a prepolymer method using a prepolymer having a molecular weight distribution as uniform as possible. First, it is preferred to have a step of reacting a polyol with a polyisocyanate to obtain a prepolymer. The NCO content in the prepolymer is not particularly limited, but is preferably 3.00 to 15.00% by mass and more preferably 6.00 to 10.00% by mass.

Subsequently, a mixture (curing agent) of a crosslinking agent and a catalyst is added to the resulting prepolymer and mixed to obtain a polyurethane elastomer composition. A polyol may be added to the curing agent. From the viewpoint of making the distance between the crosslinking points uniform, it is preferable that the number average molecular weight of the polyol added to the curing agent is matched to the number average molecular weight of the polyol used in the prepolymer. For example, the difference between the number average molecular weights of both is preferably 500 or less, 200 or less, or 100 or less.

After disposing the support member in a mold for forming the cleaning blade, the polyurethane elastomer composition is injected into a cavity and heated and cured to obtain the cleaning blade in which the plate-shaped blade member and the support member are integrated. A known mold release agent may be applied to the mold.

Alternatively, a method may be adopted in which a polyurethane elastomer sheet is separately molded from the above polyurethane raw material composition, cut into strips to prepare an elastic member, and the adhesive portion of the elastic member is superimposed on the support member coated or adhered with the adhesive, and heated and pressurized to bond to the support member.

<Process Cartridge and Electrophotographic Image Forming Apparatus>

The cleaning blade can be used while incorporated into a process cartridge configured to be attachable to and detachable from an electrophotographic image forming apparatus. Specifically, for example, in a process cartridge provided with an image bearing member as a to-be-cleaned member and a cleaning blade arranged to enable cleaning of the surface of the image bearing member, the cleaning blade according to the present aspect can be used as the cleaning blade. The process cartridge contributes to the stable formation of high-quality electrophotographs.

An electrophotographic image forming apparatus according to one aspect of the present disclosure includes an image bearing member such as a photoreceptor, and a cleaning blade arranged to enable cleaning of the surface of the image bearing member, wherein the cleaning blade is a cleaning blade according to the present aspect. The above electrophotographic image forming apparatus can stably form a high-quality electrophotographic image.

EXAMPLES

The present invention will be described below with reference to production examples, examples and comparative examples, but the present disclosure is not limited to these examples. Reagents or industrial chemicals were used as raw materials other than those shown in the examples and comparative examples.

In the Examples and Comparative Examples below, the integrally molded cleaning blade illustrated in FIG. 1 was produced and evaluated. The formulation of each Example and Comparative Example, and the properties and evaluation results of the elastic member obtained are listed in Tables 1 and 2.

Example 1

[Support Member]

A 1.6 mm-thick galvanized steel sheet was prepared and processed to obtain a support member having an L-shaped cross-section, denoted by the reference numeral 3 in FIG. 2.

A urethane-metal one-layer adhesive (trade name: Chemlok 219, manufactured by LORD Corporation) was applied to the support member at an area in contact with the elastic member.

[Preparation of Raw Materials for Elastic Members]

(Prepolymer)

The following isocyanate and polyol were reacted at a temperature of 80° C. for 3 hours to yield a prepolymer having an NCO content of 8.80% by mass.

As an isocyanate, 4,4'-diphenylmethane diisocyanate (trade name: Millionate MT, manufactured by Tosoh Corporation) (hereinafter referred to as 4,4'-MDI). 327.0 g;

As a polyol, butylene adipate-polyester polyol having a number average molecular weight of 2500 (trade name: NIPPOLAN 3027, manufactured by Tosoh Corporation) (hereinafter referred to as PBA 2500). 673.0 g.

(Curing Agent)

The following trimethylolpropane and N,N'-dimethylhexanolamine were mixed to prepare a curing agent.

Trimethylol propane (manufactured by Tokyo Chemical Industries Co., Ltd.) (hereinafter referred to as TMP). 84.3 g;

N,N'-dimethylhexanolamine (trade name: KAOLIZER No. 25, manufactured by Kao Corporation) (hereinafter referred to as No. 25). 0.25 g.

The prepolymer and the curing agent were mixed to obtain a polyurethane elastomer composition.

The adhesive-applied area of the support member was arranged to project into the cavity of the molding die for cleaning blades. The above polyurethane elastomer composition was injected into a mold for cleaning blades and cured at a temperature of 130° C. for 5 minutes. Thereafter, the mold was released to obtain an integrally molded body of the polyurethane and the support member.

The inner surface of the mold was subjected to a mold release treatment by applying a mold release agent A prior to the injection of the above polyurethane elastomer composition.

As the mold release agent A, a mixture of

"ELEMENT14 PDMS 1000-JC" 5.06 g (trade name, manufactured by Momentive Performance Materials), "ELEMENT14 PDMS 10K-JC" 6.19 g (trade name, manufactured by Momentive Performance Materials), "SR1000" 3.75 g (trade name, manufactured by Momentive Performance Materials), and "EXXSOL DSP 145/160" 85 g, was used.

The tip side of the polyurethane elastomer of the obtained integrally molded body was appropriately cut to obtain a plate-shaped elastic member having a main surface and a tip surface constituting a tip side edge together with the main surface. The angle of the edge on the tip side is set to 90°, and the distances in the short direction, thickness direction, and longitudinal direction of the elastic member were set to 7.5 mm, 1.8 mm, and 240 mm, respectively.

The resulting cleaning blade was evaluated by the following method.

[Method of Calculating Storage Elastic Modulus]

Figure 5:
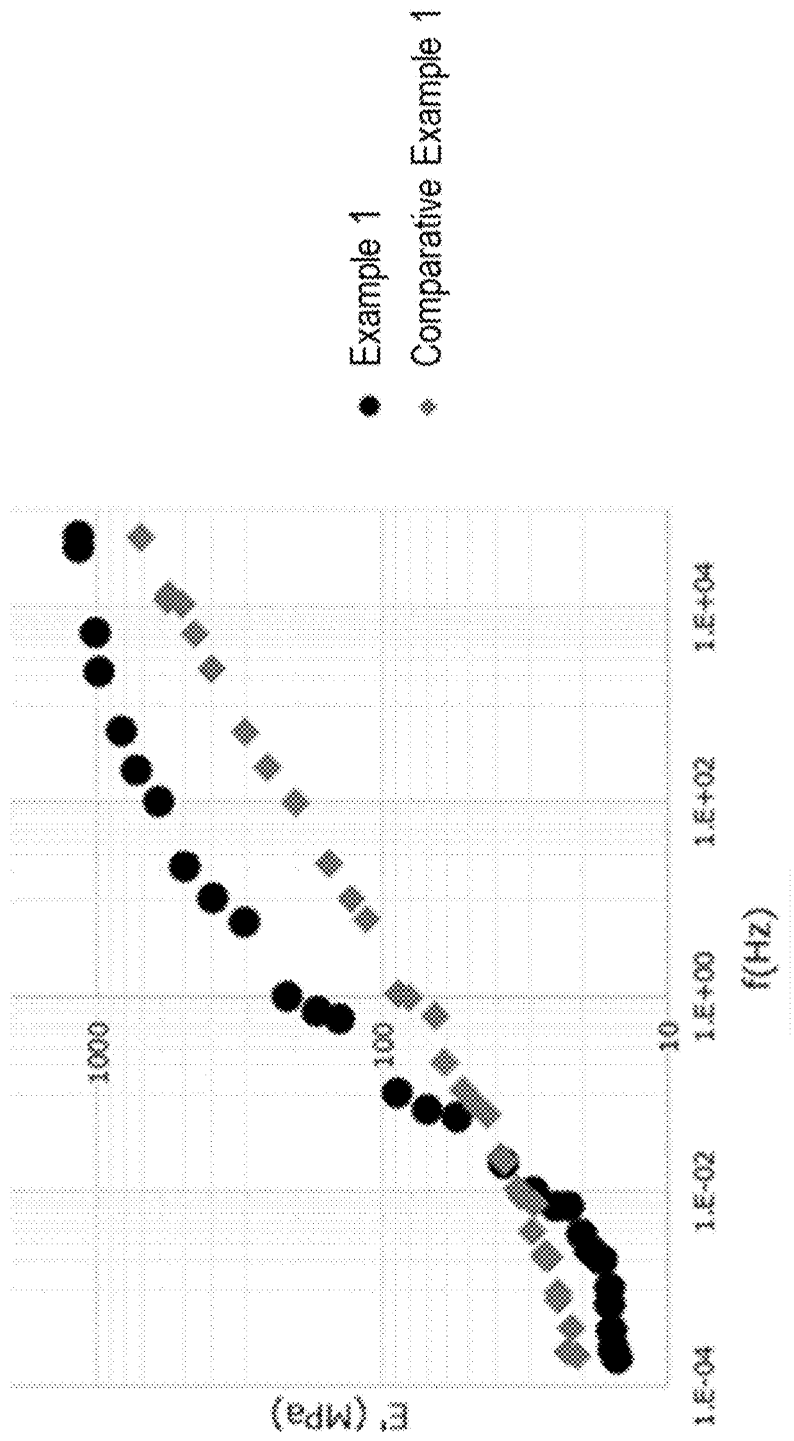
FIG. 5 is a master curve showing the relationship between the storage elastic modulus and the measured frequency of the elastic member according to Example 1 and Comparative Example 1.

The storage elastic moduli E'(1) and E'(2) of the elastic members were measured by temperature-frequency dispersion using a dynamic viscoelasticity apparatus, and a master curve at a reference temperature of 8° C. was created and calculated based on the time-temperature equivalence principle. FIG. 5 shows the resulting master curve.

The measurement conditions of dynamic viscoelasticity are described below.

Apparatus: dynamic viscoelasticity measurement device (trade name: DMA EXPLEXOR 500N, manufactured by NETZSCH)

Measurement mode: tensioned

Static strain: 2%

Dynamic strain: 0.5%

Measured temperature: −30° C. to 80° C. (2° C. steps, 56 points)

Measurement frequency: 0.1 to 100 Hz (5 points)

From the obtained results of the measurements of dynamic viscoelasticity, a master curve at a reference temperature of 8° C. was created using built-in software.

From the master curve obtained, mathematical approximation was performed based on the generalized Maxwell model.

The generalized Maxwell model is as follows.

$$E_r(\tau) = E_e + \sum_{i=1}^{N} E_i \exp\left(-\frac{\tau}{\tau_i}\right)$$

The above generalized Maxwell model is separated into storage elastic modulus E' and loss elastic modulus E" as follows.

$$E'(\omega) = E_e + \sum_{i=1}^{N} \frac{E_i \tau_i^2 \omega^2}{1 + \tau_i^2 \omega^2}$$

$$E''(\omega) = \sum_{i=1}^{N} \frac{E_i \tau_i}{1 + \tau_i^2 \omega^2}$$

In the mathematical approximation, the number of terms in the generalized Maxwell model was set as the elastic term ($E_e$)1+viscoelastic term ($E_i$)20 (i=1 to 20). τi was set at 20 points between $10^{-8}$ to $10^5$.

$E_e$ and $E_i$ were optimized by GRG non-linear (generalized reduced gradient method) so that the differences between E' and E" of the generalized Maxwell model and E' and E" in the master curve be minimum. Specifically, the solver function of Microsoft® Excel was used.

From the resulting master curve approximation, E'(1) (E' at $1\times10^{-3}$ Hz) and E'(2) (E' at $1\times10^{4}$ Hz) were obtained.

The sample for measurement was prepared as follows.

A sample was prepared to include a corner (for example, a tip edge) of a contact region of the elastic member with the to-be-cleaned member. The sample was cut into strips with a length of 50 mm, a width of 2 mm, and a thickness of 1.8 mm.

[Measurement of T2 Relaxation Time]

Spin-spin relaxation time (T2) was measured by the solid echo method in pulse NMR analysis.

Samples were cut off the elastic member of the cleaning blade from the measurement position described below and cut into 1 mm×1 mm size to prepare 1 g of samples in a test tube.

The conditions for pulse NMR measurement are as follows.

Apparatus: "JNM-MU25" (trade name, manufactured by JEOL Ltd.)

Condition: solid echo method

Measurement environment: 50° C.

The number of measurements: 128

The measurement results were separated into two components (soft segments and hard segments) by the least squares method in built-in software to obtain respective spin-spin relaxation times ($T2_L$ and $T2_S$).

In the present disclosure, the obtained T2 relaxation curve is separated into two components, that is, hard segments and soft segments, depending on the length of relaxation time. Specifically, the T2 relaxation curve is divided into two components, the hard segments and the soft segments, by curve fitting to the following equation, and spin-spin relaxation time ($T2_L$) of the soft segments and spin-spin relaxation time ($T2_S$) of the hard segments are calculated.

$$M(t) = A_L \exp\left[-\left(\frac{t}{T2_L}\right)^{mi}\right] + A_S \exp\left[-\left(\frac{t}{T2_S}\right)^{mi}\right]$$

M(t): macroscopic magnetization $A_L$: intensity of long relaxation time components (soft segment) at t=0

$T2_L$: T2 relaxation time of long relaxation time components (soft segment)

$A_S$: intensity of short relaxation time components (hard segments) at t=0

$T2_S$: T2 relaxation time of short relaxation time components (hard segments)

mi: Weibull coefficient

Measured positions: The length of the tip side edge of the cleaning blade was taken as L, and measurement was performed at positions of ⅛L, ½L, and ⅞L from one end side on the edge, and the average thereof is listed in Table 1.

[FT-IR Analysis of Elastic Member by ATR Method]

The values of the peak intensity at 1415 $cm^{-1}$ and the peak intensity at 1538 $cm^{-1}$ of the elastic member were measured by the ATR method using FT-IR.

Samples were used by cutting the elastic member of a cleaning blade from the measurement positions described below.

The conditions for FT-IR measurement are as follows.

Apparatus: "FT/IR-4700" (trade name, manufactured by JASCO Corporation)

Measurement Mode: ATR method (crystal: diamond)

Number of times of integration: 64

Measured positions: The length of the tip side edge of the cleaning blade was taken as L, and the positions of the distances ⅛L, ½L, and ⅞L from one end side on the edge were measured.

From the resulting peak intensity, the value of {(peak intensity at 1415 $cm^{-1}$)/(peak intensity at 1538 $cm^{-1}$)} was calculated, and the arithmetic mean values thereof were listed in Table 1.

[Methods of Measuring M1 and M2]

M1 and M2 were measured by a direct sample introduction method (DI method) in which samples were introduced directly into the ion source without passing through gas chromatography (GC).

As an apparatus, POLARIS Q manufactured by Thermo Fisher Scientific K.K. was used, and a direct exposure probe (DEP) was used.

When it is assumed that a line segment with a distance of 0.5 mm from the tip side edge was drawn on the tip surface of the elastic member in parallel with the tip side edge, the length of the line segment was set to L', and points of ⅛L', ½L', and ⅞L' from one end side on the line segment were set to P0', P1', and P2', respectively. The polyurethane was shaved off with a bio-cutter from P0', P1', and P2'.

0.1 μg of samples sampled at each of the P0', P1', and P2' were fixed to the filament located at the tip of the probe and inserted directly into the ionization chamber. After that, the gas was then rapidly heated from room temperature to 1000° C. at a constant ramp rate (10° C./s), and the vaporized gas was detected by a mass spectrometer.

The sum of the integrated intensities of all peaks in the obtained total ion current thermogram was used as the detection amount M1 of all ions.

An integrated intensity at peaks of an extracted ion thermogram corresponding to an m/z value in the range of 380.5 to 381.5 derived from polymeric MDI was taken as M2, and M2/M1 was calculated. Then, the arithmetic mean value of the numerical values obtained in each of the P0', P1', and P2' was set to the value of M2/M1 in the present disclosure.

[Nip Width Evaluation]

Figure 3:
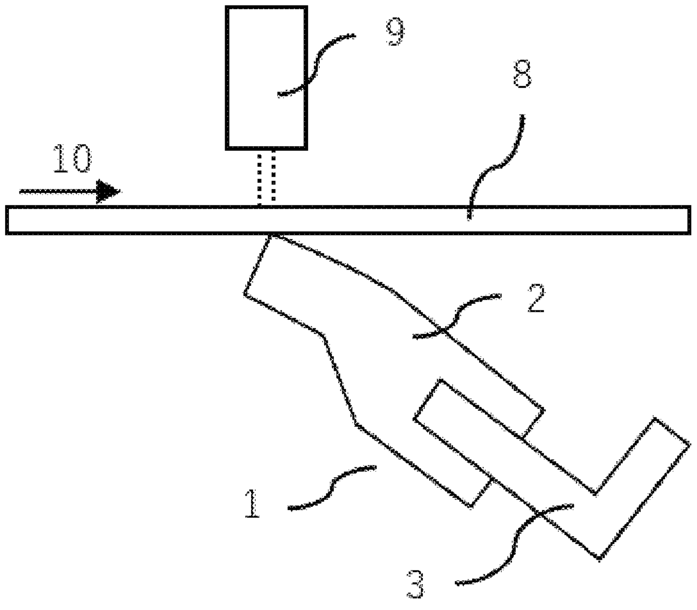
FIG. 3 is a view showing a method of measuring the nip width.

As shown in FIG. 3, the elastic member 2 of the cleaning blade 1 was brought into contact with the glass 8, on the surface of which the anti-reflection film was applied, and while moving the glass in the direction indicated by the arrow 10, the contact region (nip) between the glass and the elastic member of the cleaning blade during the movement of the glass was observed using a laser microscope 9, and the resulting images were analyzed by image analysis software (Image-Pro Plus) to measure the nip width.

Observation: with a laser microscope

Glass moving speed: 10 mm/s

Penetration level: 0.8 mm

Set angle: 25°

Measured positions: The length of the tip side edge of the cleaning blade was taken as L, and the nip widths at positions of ⅛L, ½L, and ⅞L from one end side on the edge were measured.

Since the light is blocked at the contact region, it appears black when observed with a laser microscope. Thus, the contact region and the non-contact region can be identified, and the width thereof can be measured. The average value of the measurements at the above measurement positions was evaluated as the nip width. Table 1 shows the results.

[Stick-Slip Evaluation]

Figure 4:
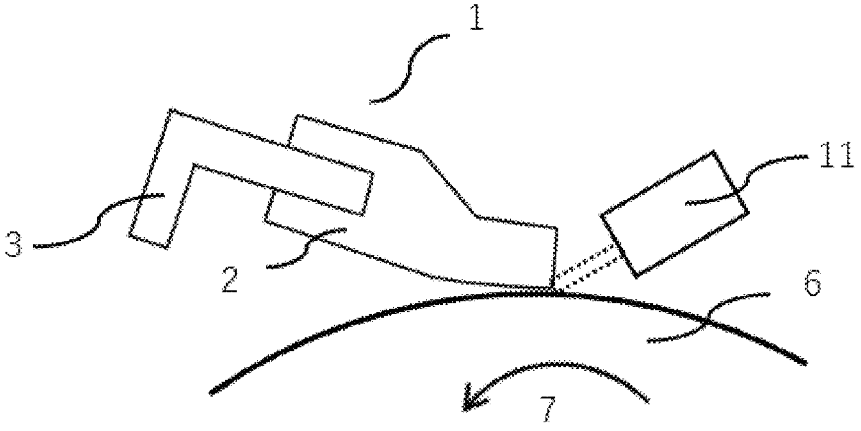
FIG. 4 is a view showing a method of measuring stick-slip.

As listed in FIG. 4, the displacement of the contact region was measured by the laser displacement meter 11 while the photoreceptor 6 as a to-be-cleaned member was brought into contact with the elastic member 2 of the cleaning blade 1 and rotated in the direction indicated by the arrow 7. The amount of displacement of the contact region was evaluated as a stick-slip width.

The measurement conditions were as follows. As the photoreceptor, an electrophotographic photosensitive drum having a diameter of 24 mm and a surface layer comprising a polyarylate resin was used.

Penetration level of cleaning blade: 0.8 mm

Set angle: 25°

Rotational speed of electrophotographic photosensitive drum: 150 rpm

When stick-slip occurs, the distance from the laser displacement meter 11 to the contact region between the elastic member 2 of the cleaning blade 1 and the photoreceptor 6 changes, so that the stick-slip width can be evaluated by the laser displacement meter.

Apparatus: laser displacement meter (trade name: LJV-7000, manufactured by KEYENCE Corporation)

Sampling frequency: 64 kHz:

Number of measurement points: 10000

Measured positions: The length of the tip side edge of the cleaning blade was taken as L, and the stick-slip widths at positions of ⅛L, ½L, and ⅞L from one end side on the edge were measured.

The average value of the measurement results at the above measurement positions was evaluated as the stick-slip width. Table 1 shows the results.

<Evaluation of Cleaning Performance>

In a cyan cartridge of a color laser beam printer (trade name: HP LaserJet Enterprise Color M554dn, manufactured by HP Inc.), the cleaning blade obtained by the above method was incorporated as a cleaning blade for a photoreceptor that was a to-be-cleaned member. Furthermore, the toner in the developer of the cyan cartridge was replaced entirely with the toner 1, which will be described below.

Subsequently, the toner was left under a low-temperature environment (at a temperature of 8° C.) for 24 hours, and 10 k prints of images were performed under the same environment. In the present disclosure, "k prints" means "×1000 prints". For example, 10 k prints represent 10×1000=10,000 prints.

Furthermore, the developer used was replaced with a fresh cyan cartridge developer prepared separately, and 10 k prints of images were performed again. This was repeated to perform a total of 150 k prints of images. A half-tone image was output as an evaluation image for every 50 k prints, and the presence or absence of the occurrence of image defects (stripes on images) due to the cleaning blade was visually observed to evaluate the image.

Performance was ranked based on the following evaluation criteria to evaluate the cleaning performance. Table 1 shows the results.

Rank A: Image defects did not occur after 150 k prints of images were finished.

Rank B: Image defects occurred after 100 k prints of images were finished.

Rank C: Image defects occurred after 50 k prints of images were finished.

Rank D: Image defects occurred before 50 k prints of images were finished.

<Method of Producing Toner 1>

In the following, "parts" are all on a mass basis unless otherwise noted.

(Preparation Step of Aqueous Medium 1)

To a reaction vessel equipped with a stirrer, a thermometer, and a reflux tube, 650.0 parts of ion-exchanged water were added, and 14.0 parts of sodium phosphate (dodecahydrate, manufactured by Rasa Industries, Ltd.) were charged, and the vessel was kept warm at 65° C. for 1.0 hour while purging with nitrogen. Using T.K.HOMO MIXER (manufactured by Tokushu Kika Kogyo Co., Ltd.), an aqueous calcium chloride solution in which 9.2 parts of calcium chloride (dihydrate) were dissolved in 10.0 parts of ion-exchanged water was charged collectively while stirring at 15000 rpm to prepare an aqueous medium containing a dispersion stabilizer. Further, 10 mass % hydrochloric acid was charged into the aqueous medium, and the pH was adjusted to 5.0 to obtain an aqueous medium 1.

(Preparation Step of Polymerizable Monomer Composition)

Styrene: 60.0 parts

C.I.Pigment Blue 15:3 6.5 parts

Said material was charged into an attritor (manufactured by Mitsui Miike Kakoki Co., Ltd.) and further dispersed using zirconia particles with a diameter of 1.7 mm at 220 rpm for 5.0 hours to prepare a pigment dispersion. The following materials were added to the pigment dispersion.

Styrene: 20.0 parts n-Butyl acrylate: 20.0 parts

Crosslinking agent (divinylbenzene): 0.3 parts

Saturated polyester resin: 5.0 parts (A polycondensate of (propylene oxide-modified bisphenol A (2 mol adduct) and terephthalic acid (molar ratio 10:12), glass transition temperature Tg=68° C., weight-average molecular weight Mw=10000, molecular weight distribution Mw/Mn=5.12)

Fischer-Tropsch wax (melting point 78° C.) 7.0 parts

This was kept warm to 65° C. and dissolved and dispersed uniformly at 500 rpm using T.K.HOMO MIXER (manufactured by Tokushu Kika Kogyo Co., Ltd.) to prepare a polymerizable monomer composition.

(Granulating Step)

The polymerizable monomer composition was charged into the aqueous medium 1 while keeping the temperature of the aqueous medium 1 at 70° C. and the number of revolutions of T.K.HOMO MIXER at 15000 rpm, and 10.0 parts of t-butyl peroxypivalate as a polymerization initiator were added. Granulation was performed for 10 minutes as was in the stirring device while keeping 15000 rpm.

(Polymerization and Distillation Step)

After the granulating step, the agitator was replaced with a propeller agitation blade, and 70° C. was kept for 5.0 hours while stirring at 150 rpm to promote polymerization, and the polymerization reaction was performed by raising the temperature to 85° C. and heating the reaction mixture for 2.0 hours.

After that, the reflux tube of the reaction vessel was replaced with a cooling tube, and the slurry was heated to 100° C., whereby distillation was performed for 6 hours to remove unreacted polymerizable monomer by distillation, thereby obtaining a dispersion of toner base particles.

(Polymerization of Organic Silicon Compounds)

In a reaction vessel equipped with a stirrer and a thermometer, 60.0 parts of ion-exchanged water were weighed, and the pH was adjusted to 4.0 using 10 mass % hydrochloric acid. This was heated with stirring to a temperature of 40° C.

Then, 40.0 parts of methyltriethoxysilane, an organic silicon compound, was added, and the resulting mixture was stirred for 2 hours or longer to proceed hydrolysis. The endpoint of hydrolysis was confirmed by visual observation that the oil and water did not separate and form a single layer, and the reaction mixture was cooled to give a hydrolysis solution of an organic silicon compound.

After cooling the temperature of the resulting toner base particle dispersion to 55° C., 25.0 parts of a hydrolysis solution of the organic silicon compound were added to initiate the polymerization of the organic silicon compound. After holding the mixture as was for 15 minutes, the pH was adjusted to 5.5 with 3.0 mass % aqueous sodium bicarbonate solution. After keeping it for 60 minutes while maintaining stirring at 55° C., the pH was adjusted to 9.5 using a 3.0 mass % aqueous sodium bicarbonate solution, and then kept for 240 minutes to obtain a toner particle dispersion.

(Washing and Drying Step)

After the polymerization step, the toner particle dispersion was cooled, hydrochloric acid was added to the toner particle dispersion to adjust the pH to 1.5 or less, allowed to stir for 1 hour, and then subjected to solid-liquid separation with a pressure filter to obtain a toner cake. The toner cake was re-slurried with ion-exchanged water to obtain a dispersion again, and then subjected to solid-liquid separation with the filter described above to obtain a toner cake.

The resulting toner cake was dried and classified in a thermostatic bath at 40° C. over 72 hours to obtain a toner 1.

Examples 2 to 10 and Comparative Examples 1 to 7

As listed in Tables 1 and 2, a prepolymer and a curing agent were prepared in the same manner as in Example 1, except that materials and/or formulation amounts were changed to obtain a polyurethane elastomer composition. A cleaning blade was produced using the resulting polyurethane elastomer, and the resulting cleaning blade was evaluated in the same manner as in Example 1. Tables 1 and 2 show the evaluation results. FIG. 5 shows a master curve showing the relationship between the storage elastic modulus (E') and the measured frequency obtained in the same manner as in Example 1 of the elastic member according to Comparative Example 1.

Details of the materials used, except for those indicated in Example 1, are shown below.

Polybutylene adipate-polyester polyol having a number average molecular weight of 1000 (trade name: NIPPOLAN 4009, manufactured by Tosoh Corporation) (hereinafter referred to as PBA 1000).

Polybutylene adipate-polyester polyol having a number average molecular weight of 2000 (trade name: NIPPOLAN 4010, manufactured by Tosoh Corporation) (hereinafter referred to as PBA 2000).

Polyhexylene adipate-polyester polyol having a number average molecular weight of 2600 (trade name: NIPPOLAN 136, manufactured by Tosoh Corporation) (hereinafter referred to as PHA 2600)

Polyhexylene adipate-polyester polyol having a number average molecular weight of 1000 (trade name: NIPPOLAN 164, manufactured by Tosoh Corporation) (hereinafter referred to as PHA 1000)

Poly(tetramethylene ether) glycol having a number average molecular weight of 1000 (trade name: PTG-1000SN, manufactured by Hodogaya Chemical Co., Ltd.) (hereinafter referred to as PTMG 1000).

polymeric MDI (product name: Millionate MR-400, manufactured by Tosoh Corporation) (hereinafter referred to as pMDI)

1,4-Butanediol (manufactured by Tokyo Chemical Industries Co., Ltd.) (hereinafter referred to as 1,4-BD).

POLYCAT 46 (manufactured by Air Products Japan, Inc.) (hereinafter referred to as PC46).

TOYOCAT-RX5 (manufactured by Tosoh Corporation) (hereinafter referred to as RX5).

TEDA (triethylenediamine) (manufactured by Tosoh Corporation)

K-KAT XK-627 (manufactured by Kusumoto Chemicals, Ltd.) (hereinafter referred to as K-KAT)

TABLE 1

| | | | | Example 1 | Example 2 | Example 3 | Example 4 | Example 5 | Example 6 |
|---|---|---|---|---|---|---|---|---|---|
| Composition | Prepolymer | MDI | Blending amount (g) | 327.0 | 327.0 | 344.2 | 327.0 | 343.1 | 327.0 |
| | | pMDI | Blending amount (g) | 0 | 0 | 0 | 0 | 0 | 20 |
| | | Polyol | Type | PBA2500 | PBA2500 | PBA2000 | PBA2500 | PBA1000 | PBA2500 |
| | | | Blending amount (g) | 673.0 | 673.0 | 655.8 | 673.0 | 656.9 | 653.0 |
| | Curing agent | 1.4-BD | Blending amount (g) | 0 | 0 | 0 | 0 | 0 | 0 |
| | | TMP | Blending amount (g) | 84.3 | 64.5 | 84.3 | 77.4 | 57.5 | 90.3 |
| | | Polyol | Type | — | PHA1000 | — | PHA1000 | — | — |
| | | | Blending amount (g) | 0 | 64.5 | 0 | 77.4 | 0 | 0 |
| | | No. 25 | Blending amount (g) | 0.25 | 0.22 | 0.25 | 0.46 | 0.17 | 0.27 |
| | | PC46 | Blending amount (g) | 0 | 0.05 | 0 | 0 | 0 | 0 |
| | | RX5 | Blending amount (g) | 0 | 0 | 0 | 0 | 0 | 0 |
| | | TEDA | Blending amount (g) | 0 | 0 | 0 | 0 | 0 | 0 |
| | | K-KAT | Blending amount (g) | 0 | 0 | 0 | 0 | 0 | 0 |
| | Crosslinking agent concentration | | mmol/g | 0.58 | 0.43 | 0.58 | 0.50 | 0.41 | 0.61 |

TABLE 1-continued

| | | | | | | | | |
|---|---|---|---|---|---|---|---|---|
| Storage elastic modulus | E'(1) | Mpa | 16.3 | 17.4 | 17.5 | 12.4 | 12.9 | 17.1 |
| | E'(2) | Mpa | 1123 | 538 | 1475 | 545 | 1342 | 1205 |
| Pulse NMR | T2L | μs | 291 | 318 | 252 | 311 | 271 | 277 |
| | T2S | μs | 54.9 | 52.2 | 55.3 | 59.7 | 67.3 | 53.4 |
| IR | $1415\ cm^{-1}$/ $1538\ cm^{-1}$ | — | 0.56 | 0.64 | 0.55 | 0.57 | 0.53 | 0.54 |
| Mass spectrometry | M2/M1 | — | 0 | 0 | 0 | 0 | 0 | 0.0009 |
| Evaluation | Nip width | μm | 22.3 | 18.6 | 20.1 | 25.0 | 24.3 | 20.4 |
| | Stick-slip width | μm | 12.2 | 15.7 | 11.8 | 16.0 | 12.7 | 12.5 |
| | Durability evaluation rank | | A | B | A | B | A | A |

| | | | | Example 7 | Example 8 | Example 9 | Example 10 |
|---|---|---|---|---|---|---|---|
| Composition | Prepolymer | MDI | Blending amount (g) | 327.0 | 327.0 | 389.8 | 389.8 |
| | | pMDI | Blending amount (g) | 0 | 0 | 0 | 0 |
| | | Polyol | Type | PHA2600 | PBA2500 | PTMG1000 | PTMG1000 |
| | | | Blending amount (g) | 673.0 | 673.0 | 610.2 | 610.2 |
| | Curing agent | 1.4-BD | Blending amount (g) | 0 | 0 | 0 | 0 |
| | | TMP | Blending amount (g) | 84.3 | 84.3 | 76.3 | 76.2 |
| | | Polyol | Type | — | — | — | PTMG1000 |
| | | | Blending amount (g) | 0 | 0 | 0 | 76.2 |
| | | No. 25 | Blending amount (g) | 0.25 | 0.17 | 0.23 | 0.46 |
| | | PC46 | Blending amount (g) | 0 | 0.02 | 0 | 0 |
| | | RX5 | Blending amount (g) | 0 | 0 | 0 | 0 |
| | | TEDA | Blending amount (g) | 0 | 0 | 0 | 0 |
| | | K-KAT | Blending amount (g) | 0 | 0 | 0 | 0 |
| | Crosslinking agent concentration | | mmol/g | 0.58 | 0.58 | 0.53 | 0.49 |
| Storage elastic modulus | E'(1) | | Mpa | 15.2 | 17.4 | 17.9 | 13.2 |
| | E'(2) | | Mpa | 985 | 1130 | 1019 | 753 |
| Pulse NMR | T2L | | μs | 295 | 279 | 275 | 297 |
| | T2S | | μs | 55.3 | 53.7 | 64.4 | 84.2 |
| IR | $1415\ cm^{-1}$/ $1538\ cm^{-1}$ | | — | 0.56 | 0.62 | 0.56 | 0.55 |
| Mass spectrometry | M2/M1 | | — | 0 | 0 | 0 | 0 |
| Evaluation | Nip width | | μm | 24.2 | 18.0 | 18.3 | 21.2 |
| | Stick-slip width | | μm | 13.0 | 13.4 | 14.3 | 14.1 |
| | Durability evaluation rank | | | A | A | A | A |

TABLE 2

| | | | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|
| Composition | Prepolymer | MDI | Addition amount (g) | 188.3 | 362.8 | 286.0 | 327.0 | 305.2 | 343.1 | 188.3 |
| | | pMDI | Addition amount (g) | 210.0 | 0.0 | 0.0 | 0.0 | 0.0 | 0.0 | 210.0 |
| | | Polyol | Type | PBA2500 | PBA2000 | PBA2000 | PBA2500 | PBA2500 | PBA1000 | PBA2500 |
| | | | Addition amount (g) | 601.7 | 637.2 | 714.0 | 673.0 | 694.8 | 656.9 | 601.7 |
| | Curing agent | 1.4-BD | Addition amount (g) | 0 | 0 | 0 | 12.9 | 0 | 0 | 0 |
| | | TMP | Addition amount (g) | 58.0 | 91.1 | 20.4 | 23.7 | 70.4 | 46.1 | 58.0 |
| | | Polyol | Type | PHA1000 | — | — | PHA1000 | PHA1000 | — | PHA1000 |
| | | | Addition amount (g) | 329 | 0 | 0 | 168 | 70.4 | 0 | 329 |
| | | No.25 | Addition amount (g) | 0 | 0.27 | 0 | 0.35 | 0.42 | 0.17 | 0.53 |
| | | PC46 | Addition amount (g) | 0.04 | 0 | 0 | 0.08 | 0 | 0 | 0.17 |
| | | RX5 | Addition amount (g) | 1.35 | 0 | 0 | 0 | 0 | 0 | 0 |
| | | TEDA | Addition amount (g) | 0 | 0 | 0.10 | 0 | 0 | 0 | 0 |
| | | K-KAT | Addition amount (g) | 0 | 0 | 0.20 | 0 | 0 | 0 | 0 |
| | Crosslinking agent concentration | | mmol/g | 0.29 | 0.62 | 0.15 | 0.15 | 0.46 | 0.32 | 0.29 |
| Storage elastic modulus | E'(1) | | Mpa | 26.5 | 19.0 | 19.3 | 14.0 | 11.1 | 11.3 | 20.4 |
| | E'(2) | | Mpa | 542 | 1435 | 346 | 368 | 532 | 1286 | 546 |
| Pulse NMR | T2L | | μs | 374 | 255 | 352 | 334 | 342 | 270 | 327 |
| | T2S | | μs | 30.9 | 42.8 | 33.5 | 49.1 | 63.3 | 90.5 | 52.1 |
| IR | $1415\ cm^{-1}$/ $1538\ cm^{-1}$ | | — | 0.74 | 0.56 | 0.61 | 0.80 | 0.55 | 0.56 | 0.64 |
| Mass spectrometry | M2/M1 | | — | 0.0120 | 0 | 0 | 0 | 0 | 0 | 0.0120 |
| Evaluation | Nip width | | μm | 8.4 | 14.8 | 13.7 | 24.3 | 32.0 | 31.0 | 12.9 |
| | Stick-slip width | | μm | 16.2 | 13.3 | 31.8 | 33.6 | 16.2 | 14.3 | 17.6 |
| | Durability evaluation rank | | | C | C | D | D | D | D | C |

At least one aspect of the present disclosure can provide a cleaning blade that can stably demonstrate excellent cleaning performance over a long period of time. In addition, at least one aspect of the present disclosure can provide a process cartridge that contributes to the formation of high-quality electrophotographic images. In addition, at least one aspect of the present disclosure can provide an electrophotographic image forming apparatus that can stably form high-quality electrophotographic images.

While the present disclosure has been described with reference to embodiments, it is to be understood that the present disclosure is not limited to the disclosed embodiments. The scope of the following claims is to be accorded the broadest interpretation so as to encompass all such modifications and equivalent structures and functions.

The invention claimed is:

1. An electrophotographic cleaning blade comprising:

an elastic member comprising a polyurethane; and a support member supporting the elastic member, wherein the electrophotographic cleaning blade cleans a surface of a to-be-cleaned member by bringing a part of the elastic member into contact with the surface of the to-be-cleaned member that is moving, and wherein in an environment of 8° C., when a storage elastic modulus of the elastic member at a vibration frequency of $1\times10^{-3}$ Hz is denoted as E'(1) and a storage elastic modulus at a vibration frequency of $1\times10^{4}$ Hz is denoted as E'(2), the E'(1) is 12.0 to 18.0 MPa, and the E'(2) is 530.0 to 1500.0 MPa.

2. The electrophotographic cleaning blade according to claim 1, wherein the polyurethane is a polyurethane elastomer consisting of hard segments and soft segments, and wherein in a pulse nuclear magnetic resonance (NMR) measurement at an environment of 50° C., when separated into two components of the hard segments and the soft segments, a spin-spin relaxation time ($T2_L$) of the soft segments is 250 to 320 μs.

3. The electrophotographic cleaning blade according to claim 1, wherein in a Fourier transform infrared (FT-IR) measurement of the elastic member using diamond as an attenuated total reflection (ATR) crystal, a ratio of a peak intensity at 1415 $cm^{-1}$ to a peak intensity at 1538 $cm^{-1}$ is 0.50 to 0.65.

4. The electrophotographic cleaning blade according to claim 1, wherein when a side of the electrophotographic cleaning blade that is in contact with the surface of the to-be-cleaned member is defined as a tip side of the electrophotographic cleaning blade, the elastic member has a plate shape having, at least on the tip side, a main surface facing the to-be-cleaned member and a tip surface forming a tip side edge together with the main surface, and assuming that a third line segment is drawn on the tip surface in parallel to the tip side edge at a distance of 0.5 mm from the tip side edge, a length of the third line segment is denoted as L', and points of ⅛L', ½L', and ⅞L' from one end side on the third line segment are respectively denoted as P0', P1', and P2', when samples respectively sampled at the P0', P1', and P2' are heated and vaporized in an ionization chamber, and heated up to 1000° C. at a ramp rate of 10° C./s using a direct sample introduction type mass spectrometer that ionize sample molecules, a detection amount of all ions obtained is denoted as M1, and when an integrated intensity of peaks of an extracted ion thermogram corresponding to an m/z value in a range of 380.5 to 381.5 derived from polymeric MDI is denoted as M2, M2/M1 is less than 0.0010.

5. A process cartridge comprising the electrophotographic cleaning blade according to claim 1.

6. An electrophotographic image forming apparatus comprising the electrophotographic cleaning blade according to claim 1.

* * * * *